Patented July 17, 1951

2,560,760

UNITED STATES PATENT OFFICE 2,560,760

2-HYDROXYMETHYL-6-CHLOROTHYMOL

Herman Eldridge Faith, Indianapolis, Ind., assignor to Allied Laboratories, Inc., Kansas City, Mo., a corporation of Delaware No Drawing. Application October 11, 1949,
Serial No. 120,830

1 Claim. (Cl. 260—618)

The present invention relates to the new chemical compound 2-hydroxymethyl-6-chlorothymol and a method of preparation thereof.

I have discovered that 2-hydroxymethyl-6-chlorothymol has a very desirable type of chemical activity which makes it a valuable intermediate for the preparation of a new class of compounds useful as bactericidal and fungicidal agents.

My new compound, 2-hydroxymethyl-6-chlorothymol is prepared as follows:

Eighteen and one-half parts of 6-chlorothymol are dissolved in 50 parts of water containing 4.4 parts of sodium hydroxide. To this are added 7.8 parts of 40% formaldehyde solution (formalin). The solution is allowed to stand until no formaldehyde odor is evident (36 to 48 hours). Then it is acidified with acetic acid. The solid precipitate is filtered off, dissolved in ether, and dried with magnesium sulfate. The ether is removed by distillation and the residue is diluted with petroleum ether, causing the product to precipitate as white crystals melting 62–64° C., yield, 54%.

In the above preparation instead of the aqueous formaldehyde solution other formaldehyde yielding substances may be employed such as paraformaldehyde and trioxane. Sodium hydroxide is the preferred alkali but other alkalies such as potassium hydroxide may be used.

The 2-hydroxymethyl-6-chlorothymol prepared in accordance with the present invention will react with phenols in general to give a class of methylenebis phenols which are claimed in my copending application, Serial No. 120,829, filing date October 11, 1949.

The only related compound known theretofore of which I have knowledge is 6-hydroxymethylthymol. 6-Hydroxymethylthymol will not react with phenols other than thymol itself to give distinct products. The ability of my 2-hydroxymethyl-6-chlorothymol to react with phenols in general is, therefore, an unusual property.

What I claim is:

The compound 2-hydroxymethyl-6-chlorothymol.

HERMAN ELDRIDGE FAITH.

REFERENCES CITED

The following references are of record in the file of this patent:

UNITED STATES PATENTS

| Number | Name | Date |
|---|---|---|
| 2,321,627 | Rothrock | June 15, 1943 |
| 2,397,018 | Kroeger et al. | Mar. 19, 1946 |
| 2,398,069 | Young | Apr. 9, 1946 |